June 21, 1932. E. I. McKESSON 1,863,930
SURGICAL EQUIPMENT
Filed Dec. 21, 1926
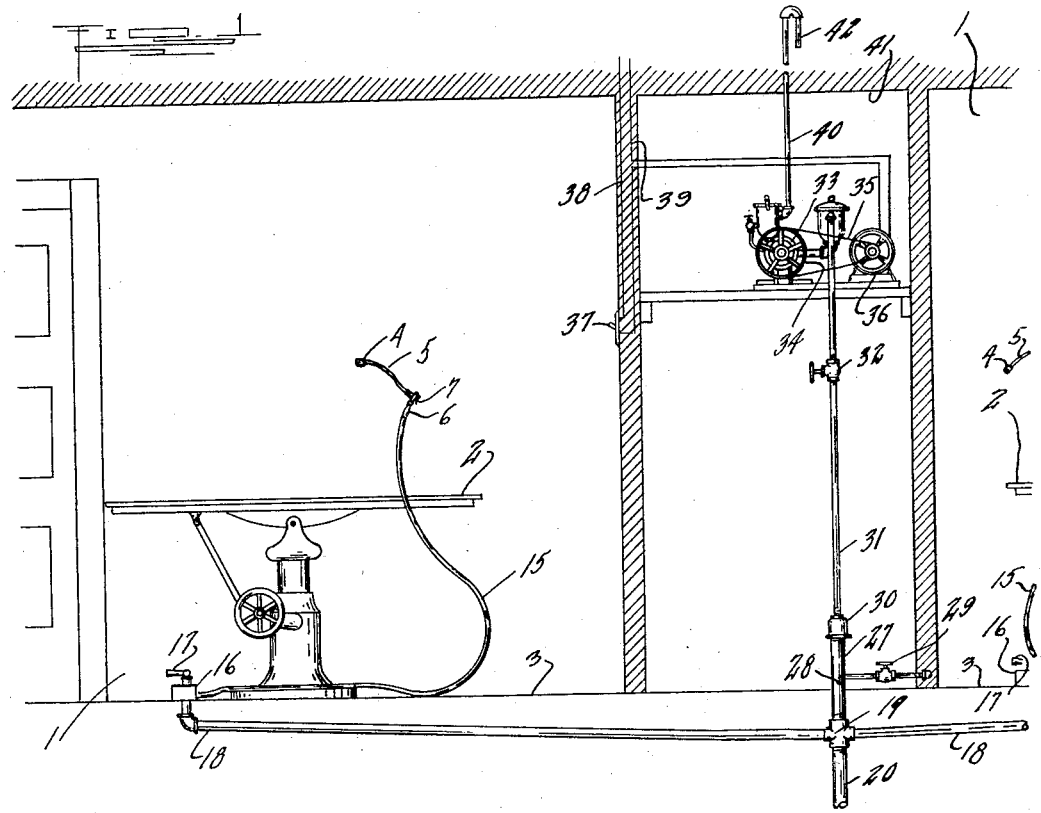
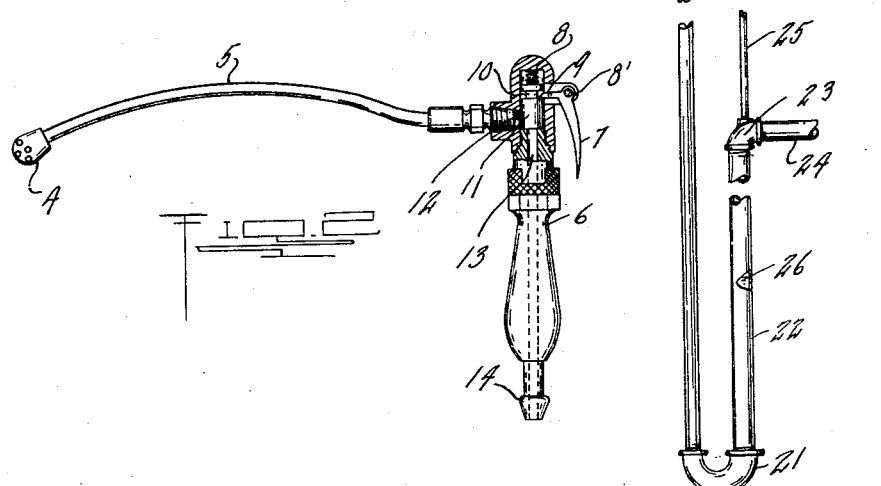
Inventor
Elmer I McKesson
By Geo O Kirk
Attorney Patented June 21, 1932

1,863,930

UNITED STATES PATENT OFFICE

ELMER I. McKESSON, OF TOLEDO, OHIO

SURGICAL EQUIPMENT

Application filed December 21, 1926. Serial No. 156,211.

This invention relates to handling of liquids, especially as having volatiles therewith.

This invention has utility when incorporated for drawing off liquids in operations upon human beings, wherein the volatiles arising from the liquids are simultaneously removed clear of the operating room.

Referring to the drawing:

Fig. 1 is a side elevation with parts broken away of an embodiment of the invention; and Fig. 2 is a detail view, partially in section, of the controllable suction or intake nozzle.

Operating room 1 is shown as having operating table 2, on floor 3. Hand tool is shown as having perforate terminus 4 with duct 5 therefrom to handle 6 carrying trigger 7 depressible against the resistance of spring 8 on fulcrum 8', for thereby having fork 9 integral with the trigger 7 as rocked, and engaging reduced portion 10, in plunger 11, shift such plunger 11 clear of port 12 so that suction in duct 13 of the handle 6 may be effective through the duct 5 for sucking liquid containing material through the openings in perforate terminal 4.

This duct 13 of the handle 6 terminates in fitting 14 from which extends flexible tube 15 to valve housing 16 having handle 17 shiftable for placing the duct 15 into communication with pipe 18 extending to branch fitting 19 having downwardly therefrom pipe 20 to bend 21 thence upwardly extending by pipe 22 to fitting 23 having pipe 24 therefrom as a sewer line or waste. From this fitting 23 extends vent 25 which may extend upwardly any desired height and is effective for passing off of vapor accumulation as well as allowing atmospheric pressure upon liquid 26 in the pipe 22 of the water or liquid seal trap comprising the pipe 22, the bend 21, and the pipe 20. The pipe 22 is of considerably larger cross sectional area than the pipe 20, so that depression of the liquid in the pipe 22 in response to suction in the pipe 20 means a much greater rise of the liquid in the pipe 20 than the extent of the depression in the pipe 22. The drop of this pipe 22, say of four inch soil pipe, may be 8 ft. from the pipe 24, while from the waste 24 the extent of the two and one half inch pipe 20 upwardly to the branch fitting 19 is desirably 28 ft., as a minimum, thereby making the total distance from the bend 21 to the fitting 19, of 36 ft. From this fitting 19 may be additional branch pipe 18 to other locations or operating rooms in such number as may be desired.

Upwardly from this fitting 19 is pipe 27 having jet 28 controlled by valve 29 as a supply of flushing water which may be intermittently supplied to maintain or flush the trap. This pipe 27 is further provided with cap 30 from which extends reduced diameter pipe 31 past valve 32 to suction pump 33 having pulley 34 driven by belt 35 from electric motor 36 as controlled by switch 37 bringing in supply current from lines 38, 39. This suction pump 33 has discharge line 40 rising therefrom preferably through roof 41 to outside vent 42.

In the use of this equipment especially in connection with surgical operations wherein there is a flushing of more or less putrid or diseased matter which is in or adjacent the wound, such matter, together with the objectionable odors therefrom, may be quickly and effectively removed with the maintenance of the wound clean and aseptic. This end is effected by inserting the terminus 4 with the duct 5 into the desired location or exploring such about therein with the parts so shielded that the suction action permitted by depressing the trigger 7 is effective for withdrawing the liquids from the diseased regions together with the odor thereof. The operation of the suction pump 33 has created such a pull in the lines 18, 20, that the water 26 has its level in the pipes 20, 22, so disturbed as to rise a very considerable distance in the pipe 20 short of the branch 18. This pull action at the water trap thus makes such pull through the duct 15 to this hand instrument for exhausting the region being treated of the being undergoing the operation or treatment. The liquid thus flowing into the pipe 18 combines with the water in the pipe 20 and as the level is now exceeded it will drip out or be flushed over into the waste 24 according to the operation of the water supply jet 28. Simultaneously with this effective disposal of the liquid, the fumes or odors in the operating room are likewise all removed and pass upward from fitting 19 through pipes 27, 31, the pump 33 and the pipe 40 and are discharged by the vent 42.

It is thus seen that a single pump source is located against contamination transmission to the operating rooms; that such is effective in multiple for different valves 16 and hand pieces 6 as independently controlled; that in the removal, there is automatic separation of the volatiles from the liquid with a carrying of both away from the operating rooms. This device eliminates the handling of infectious matter and excreta from patients by nurses, and minimizes dangers of infection of nurses, orderlies, doctors and others who handle such matter as ordinarily contaminates the operating room floors, and utensils.

What is claimed and it is desired to secure by Letters Patent is:

1. Hospital operating room waste equipment comprising an intake nozzle having a directing handle, a flexible line from the nozzle, a suction line from the flexible line, a vent from the suction line for gas removal independently of liquid, a water seal trap liquid waste connection from the suction line, means effecting suction in the suction line for discharging gas through said vent, and a liquid accumulation operated flow-off discharge way from the trap remote from and independent of the suction line normally fluid effective for at least intermittent removal of accumulation in the trap from the suction line independently of disturbing suction line effectiveness during such discharge operation, said trap between the flow-off discharge way and the suction line being of sub-atmospheric pressure holding effectiveness.

2. Operating room suction equipment embodying a suction line, an intake nozzle therefor, a gas vent, a liquid waste line, a water seal for the waste line including a trap, a suction producing means between the outlet of the vent and the suction line for effecting gas removal at the vent independently of through the trap connection for the suction line and a liquid accumulation operated flow-off discharge way from the trap remote from and independent of the suction line normally fluid effective for at least intermittent removal of accumulation in the trap from the suction line independently of disturbing suction line effectiveness during such discharge operation.

3. Surgical suction apparatus comprising an intake nozzle, a suction conduit, a flexible tube leading from the nozzle to the conduit, a U-shaped tubular trap having a relatively long leg connected to the suction conduit so as to serve as a drain therefor and a relatively short leg having a discharge opening at its upper end, said trap being adapted to contain liquid that will drain from the short leg of the trap as liquid is added to the long leg of the trap, motor driven suction producing means for producing suction through said conduit and tube, and an air discharge tube leading from the suction means.

4. In apparatus for surgical use, a motor, a suction device operated by the motor, a hollow member communicating with the device, an intake tube, there being means providing a port for connection to the tube for conducting liquid and gas to the member, said device providing a take-off for the gas, and a tubular trap having a relatively long leg connected with the member so as to serve as a drain therefor, said trap additionally having a short leg and said trap being adapted to contain a column of liquid that will drain from the relatively short leg of the trap as the liquid draining from the hollow member is added to the liquid in the trap.

In witness whereof I affix my signature.

ELMER I. McKESSON.